Figure 1:
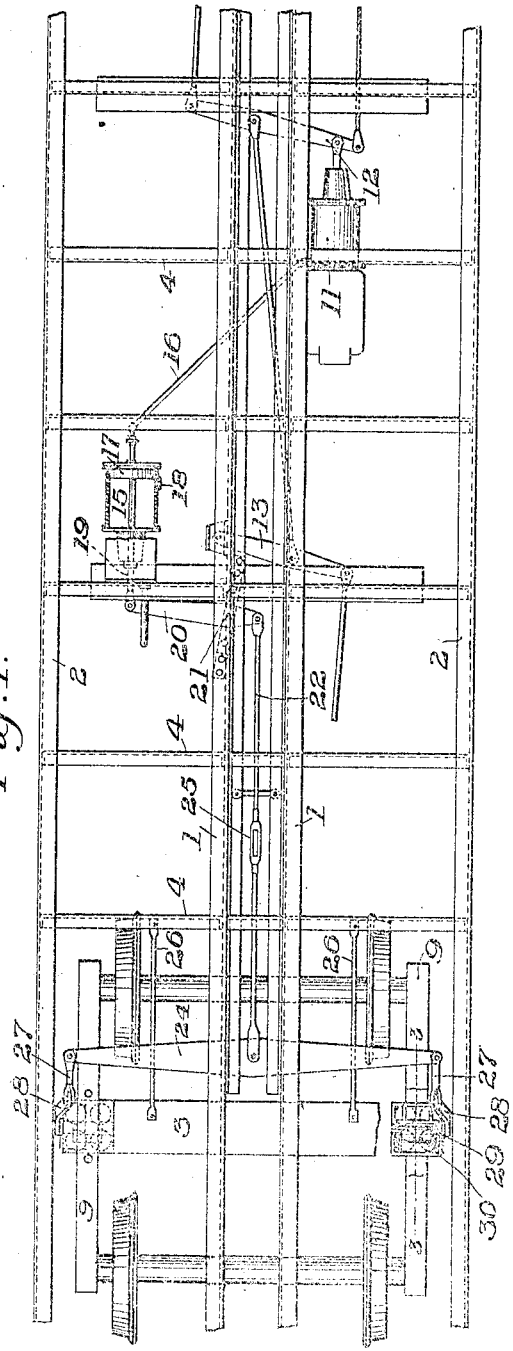

H. H. FORNEY & O. B. SCHOENKY.
LOAD REGULATED BRAKE MECHANISM.
APPLICATION FILED AUG. 12, 1908.

920,310.

Patented May 4, 1909.
2 SHEETS—SHEET 1.

WITNESSES

INVENTORS

H. H. FORNEY & O. B. SCHOENKY.
LOAD REGULATED BRAKE MECHANISM.
APPLICATION FILED AUG. 12, 1908.
920,310.
Patented May 4, 1909.
2 SHEETS—SHEET 2.
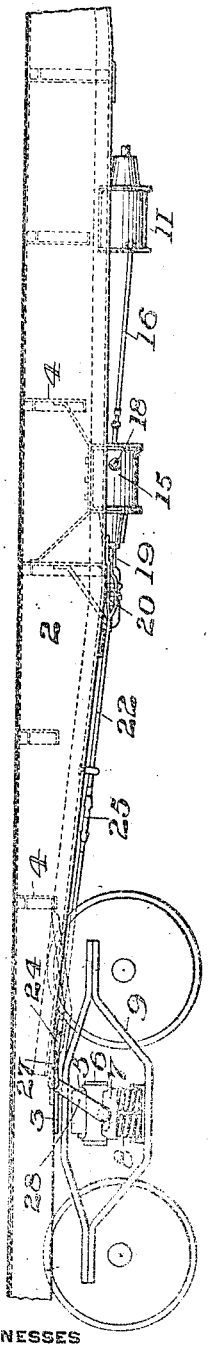
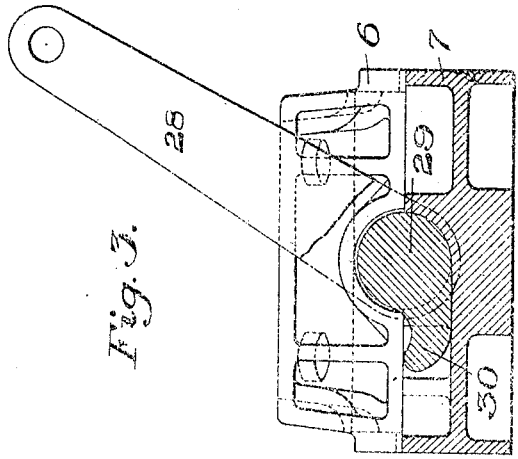
WITNESSES
INVENTORS

UNITED STATES PATENT OFFICE.

HENRY H. FORNEY, OF SAN FRANCISCO, AND OTTO B. SCHOENKY, OF BURLINGAME, CALIFORNIA.

LOAD-REGULATED BRAKE MECHANISM.

No. 920,310.  Specification of Letters Patent.  Patented May 4, 1909.

Application filed August 12, 1908. Serial No. 448,250.

*To all whom it may concern:*

Be it known that we, HENRY H. FORNEY, a resident of San Francisco, in the county of San Francisco and State of California, and OTTO B. SCHOENKY, a resident of Burlingame, in the county of San Mateo and State of California, have invented a new and useful Improvement in Load-Regulated Brake Mechanism, of which the following is a specification.

This invention relates to fluid pressure brake mechanism and more particularly to means for regulating or graduating the braking power in proportion to the load of weight of the car, and more particularly to means for increasing the brake power on loaded cars.

The object of the invention is to automatically raise the braking power of loaded cars and reduce the same on light or unloaded cars, so as to give uniform braking effects, maintain uniform auxiliary reservoir pressure throughout the train, thereby insuring uniform release of the brakes, prevent or at least minimize the danger of skidding and flattening the wheels, and also permit handling an increased number of cars in trains, particularly when running down grade where a high brake percentage is required, and without interfering in any way with the flexibility of the operation of the brakes.

The invention, generally speaking, comprises the combination of the usual fluid pressure brake cylinder, together with a relief vent therefor and means controlled by the load or weight of the car for controlling said relief vent.

In the accompanying drawing, Figure 1 is a diagrammatic view showing in plan the under frame of the car with the improved brake mechanism applied thereto, parts being shown in horizontal section; Fig. 2 is a diagrammatic view showing these parts in side elevation; and Figs. 3 and 4 are vertical sections taken transversely of the bolster on the line 3—3, Fig. 1, showing the parts in different positions.

The invention is applicable to a railway car of any type or construction.

The drawings show a typical form of metal underframe having center sills 1, side sills 2, body bolster 3 and transverse ties or beams 4. This underframe is supported upon the truck bolster 5 which at its ends is provided with filling blocks 6 resting on the caps 7 of the springs 8 shown supported in a diamond or arch bar truck frame 9. These parts, however, have been merely selected to illustrate the application of the invention, but without intending to limit the invention to any particular form of car or truck frame.

The car will be provided with automatic fluid pressure brake mechanism of any standard type. In the drawings only a portion of such brake mechanism is shown, namely, the brake cylinder 11, cylinder lever 12, floating lever 13 and the usual connecting rods. As the invention has nothing to do with any of these parts they are not illustrated in detail nor will they be described. The invention comprises certain additions to the usual fluid pressure brake mechanism and now to be described.

An auxiliary cylinder 15 is connected with the brake cylinder 11 through pipe 16 so that the piston 17 of said auxiliary cylinder is at all times subjected to the same pressure as exists in the brake cylinder. This piston controls an exhaust or relief port 18, shown as formed through the walls of the cylinder and controlled directly by the piston itself, although it is obvious that the relief port might be controlled indirectly from the piston, such as having a suitable vent valve actuated by the piston rod 19. The piston rod 19 is connected to one end of the lever 20 pivoted at 21 to the car frame and having connected to its opposite end the connecting rod 22 leading to the cross lever or equalizer 24. The connecting rod 22 preferably is provided with a turnbuckle 25 for purposes of adjustment.

The equalizing lever 24 is guided by supporting bars 26 secured to the under-frame. Connected to each end of the equalizing lever is a link or connecting rod 27 pivoted to the outer end of crank arm 28 on a rotating member or shaft 29 which is located between the spring cap 7 and the filling block 6, said spring cap and filling block being suitably shaped to receive said rotating member 29. This rotating member or shaft is provided on one side with a projection or cam 30 arranged to contact with the filling block and lift or tend to lift said filling block and bolster when the connecting rod 22 is pulled.

The operation of the mechanism is as follows: Whenever the brakes are applied and fluid pressure enters the brake cylinder 11 it also passes through pipe 16 into the auxiliary cylinder 15 and forces the piston 17 outwardly. This pushes on the lever 20, swinging the same on its pivot and causing the same to pull on the connecting rod 22 and on the crank arms 28. This has a tendency to rotate the shafts or bodies 29, thereby bringing the cams or projections 30 into contact with the lower faces of the filling blocks and tending to lift the bolster. The parts are so proportioned that the piston 17 does not uncover the relief or exhaust port 18 until the bolster is lifted. It is obvious that if the car is light or unloaded it will require a comparatively low pressure to drive the piston 17 over sufficiently far to lift the bolster and car body and open the relief vent to the atmosphere, while if the car is heavy or loaded it will require a much higher pressure to drive the piston over to such position. When the pressure in the brake cylinder falls below that which is sufficient to lift the bolster and car body, the piston 17 moves backward and closes the relief vent. Consequently the amount of pressure retained in the brake cylinder is regulated by the load or weight of the car body or all that part of the car or truck above the springs. In this manner a high braking effect is obtained with heavy or loaded cars, while a lighter braking effect is obtained with light or unloaded cars. Since the regulating means, namely, the rotating crank and cam mechanism is located between the car body and its supports, namely, between the truck bolster and the springs, its action is not affected by the jolting or up and down movement of the car body, but is uniform at all times.

By the mechanism described it is possible to graduate the braking power to the weight of the car, thereby minimizing or entirely overcoming the danger of skidding and flattening the wheels and also maintaining uniform auxiliary reservoir pressure throughout the train and thereby insuring uniform release of the brakes and making it possible to handle a greater number of cars in a train on grades where a high brake percentage is required.

It is obvious that various changes may be made in the construction and arrangement of the parts without departing from the spirit of the invention. For instance, the relief vent need not be controlled directly by the piston as shown, but can be controlled indirectly therefrom, such as by actuating a separate relief valve from the piston rod; also the cam members 29 can be located at any point between the car body and its supports and may be constructed in any manner to exert a lifting effect on the car body when the auxiliary cylinder is supplied with fluid pressure. All such modifications are intended to be covered by the claims, as hereinafter worded.

What we claim is:

1. Load regulated fluid pressure brake mechanism comprising in combination, a brake cylinder, and means between the truck and both ends of the truck bolster and controlled by the weight of said bolster for regulating the pressure in said cylinder.

2. Load regulated fluid pressure brake mechanism comprising in combination, a brake cylinder, means arranged to exert a lifting action simultaneously on both ends of the truck bolster, and mechanism controlled thereby for regulating the pressure in said cylinder.

3. Load regulated fluid pressure brake mechanism comprising in combination, a brake cylinder, a cam member arranged to exert a lifting action on the car, and means connected thereto for regulating the pressure in said cylinder.

4. Load regulated fluid pressure brake mechanism comprising in combination, a brake cylinder, a cam member located between the bolster and truck frame and arranged to have a lifting action on the car, and means connected thereto for regulating the pressure in said cylinder.

5. Load regulated brake mechanism comprising in combination, a brake cylinder, a relief port therefor, a piston actuated by brake cylinder pressure and arranged to control said relief port, and mechanism unyieldingly connected to said piston and arranged to exert a lifting action on the car.

6. Load regulated fluid pressure brake mechanism comprising in combination, a brake cylinder, a relief port therefor, a piston actuated by brake cylinder pressure and arranged to control said relief port, and means connected to said piston and arranged to exert a lifting action simultaneously on both ends of the truck bolster.

7. Load regulated fluid pressure brake mechanism comprising in combination, a brake cylinder, a relief port therefor, a piston actuated by brake cylinder pressure and controlling said relief port, a cam member arranged when moved to exert a lifting action on the car, and connections between said piston and cam member.

8. Load regulated fluid pressure brake mechanism comprising in combination, a brake cylinder, a piston actuated by brake cylinder pressure and controlling a relief port from the brake cylinder, a cam member between the bolster and truck frame and arranged to exert a lifting action on the car, and connections between said cam member and piston.

9. Load regulated fluid pressure brake mechanism comprising in combination, a brake cylinder, a piston actuated by brake cylinder pressure and controlling a relief port for said brake cylinder, and rotary cam members between the ends of the truck bolster and the truck frame and arranged when rotated to exert a lifting action on the car, and connections between said rotary cam members and said piston.

10. Fluid pressure brake mechanism comprising in combination, a brake cylinder, a piston actuated by brake cylinder pressure and controlling a relief port from the cylinder, rotary cam members between the ends of the truck bolster and truck frame and arranged to exert a lifting action on the car, cranks connected to said rotary cam members, an equalizing lever connected to said cranks, and means connecting said equalizing lever and piston.

11. Load regulated fluid pressure brake mechanism comprising in combination, a brake cylinder, a piston actuated by brake cylinder pressure and controlling a relief port from the cylinder, means between the ends of the truck bolster and truck frame and arranged to exert a lifting action on the car, an equalizing lever connected to said means, and a lever and connecting rod connecting said equalizing lever with said piston.

In testimony whereof, we have hereunto set our hands.

HENRY H. FORNEY.
OTTO B. SCHOENKY.

Witnesses:
 MAX EICHRADT,
 THEO. C. RICHTER.